(12) United States Patent
Grassl et al.

(10) Patent No.: US 12,115,866 B2
(45) Date of Patent: Oct. 15, 2024

(54) CONTROL DEVICE, MOTOR VEHICLE AND METHOD FOR ACTIVATING AN ACTIVE DISCHARGE CIRCUIT

(71) Applicants: AUDI AG, Ingolstadt (DE); VOLKSWAGEN AG, Wolfsburg (DE)

(72) Inventors: Tobias Grassl, Denkendorf (DE); Jan Schmäling, Hann. Münden (DE); Samy Arnaout, Kassel (DE); Marko Kertes, Munich (DE); Markus Novotny, Zierenberg (DE); Tobias Knoke, Brakel (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 17/979,950

(22) Filed: Nov. 3, 2022

(65) Prior Publication Data

US 2023/0132671 A1    May 4, 2023

(30) Foreign Application Priority Data

Nov. 3, 2021    (DE) ...................... 10 2021 128 584.4

(51) Int. Cl.
*B60L 3/04*      (2006.01)
*B60L 50/40*      (2019.01)
(Continued)

(52) U.S. Cl.
CPC ................. *B60L 3/04* (2013.01); *B60L 50/40* (2019.02); *H02J 7/0063* (2013.01); *H02J 7/00712* (2020.01); *H02J 7/345* (2013.01)

(58) Field of Classification Search
None
See application file for complete search history.

(56) References Cited

U.S. PATENT DOCUMENTS

2014/0125260 A1*   5/2014   Hashimoto ............. B60L 50/16
                                                              180/65.285
2021/0288604 A1*   9/2021   Kondo ................... B60L 3/0007

FOREIGN PATENT DOCUMENTS

DE      10 2010 015 312 A1     10/2011
DE      11 2012 004 371 T5      7/2014
(Continued)

OTHER PUBLICATIONS

German Office Action issued in German Application No. 10 2021 128 584.4 dated Jul. 14, 2022.

*Primary Examiner* — Jared Fureman
*Assistant Examiner* — Aqeel H Bukhari
(74) *Attorney, Agent, or Firm* — STAAS & HALSEY LLP (57) ABSTRACT

A method, by a control device, to activate an active discharge circuit to discharge a capacitive energy storage of at least one electrical consumer of an on-board power supply for a motor vehicle. An energy source for the on-board power supply can be coupled to the on-board power supply and be disconnected from the on-board power supply by a switching device. The control device receives a signal (S) for activating the active discharge circuit, examines, after receiving the signal (S), if the energy source is disconnected from the on-board power supply according to at least one first criterion, and activates the active discharge circuit only upon satisfaction of a condition that the energy source has been disconnected from the on-board power supply according to the at least one first criterion.

12 Claims, 3 Drawing Sheets

(51) Int. Cl.
*H02J 7/00* (2006.01)
*H02J 7/34* (2006.01)

(56) References Cited

FOREIGN PATENT DOCUMENTS

DE 10 2017 112 572 A1 12/2017
DE 10 2017 208 411 A1 11/2018

\* cited by examiner

CONTROL DEVICE, MOTOR VEHICLE AND METHOD FOR ACTIVATING AN ACTIVE DISCHARGE CIRCUIT

CROSS-REFERENCE TO RELATED APPLICATIONS

This application claims the benefit of German Application No. 10 2021 128 584.4, filed on Nov. 3, 2021, in the German Intellectual Property Office, the disclosure of which is incorporated herein by reference in its entirety.

FIELD

The present invention in accordance with described examples relates to a method for activating an active discharge circuit for discharging a capacitive energy storage of at least one electrical consumer of an on-board power supply for a motor vehicle by a control device, wherein an energy source for the on-board power supply can be activated and deactivated. Furthermore, the described examples also relate to a control device and to a motor vehicle.

BACKGROUND

In context of a high-voltage on-board power supply of a motor vehicle, it always has to be ensured that sufficient protection from an electrical shock is present. For this purpose, diverse protective measures can be provided. For example, devices, which issue a warning message or transfer the system into a defined, safe state upon recognizing an error in the high-voltage system, belong hereto. A high-voltage on-board power supply has e.g. a safe state if it has been switched off in defined manner. Then, all of the voltages, except in the high-voltage battery itself, in the system are below a certain contact voltage limit, in particular of 60 Volts DC and 30 Volts AC, respectively. The voltage within energy storages like high-voltage batteries, is galvanically disconnected from the remaining on-board power supply via a switching device in this state since complete discharge of the energy storages for establishing the zero-potential state is not possible. Therein, a high-voltage battery for providing the supply energy is not the only energy storage in a high-voltage on-board power supply. While the high-voltage battery can be switched off by the switching device, other, mostly much smaller energy storages, in particular capacitive energy storages, in the system have to be discharged after switching off. These smaller energy storages are for example capacitors, which are directly installed in the high-voltage components or high-voltage consumers for buffering energy or for interference suppression.

In vehicles with electrical energy storage, thus, there is the requirement of discharging the energy stored in such a capacitive energy storage as fast as possible for safety reasons for example after switching the vehicle off, after a CAN bus timeout or caused by further activation reasons. Thereto, a passive and an active discharge are applied. Often, the passive discharge is realized by a very great discharge resistor permanently connected in parallel with the capacitive energy storage. Correspondingly, a passive discharge also takes relatively long and cannot be used for a discharge of great capacitances within seconds. In order to achieve a fast discharge, the active discharge or active discharge circuit is correspondingly activated directly after the request without delay. However, it has manifested that this approach is not necessarily also the best one in each situation.

For example, DE 11 2012 004 371 T5 describes a motor vehicle with an electric motor, a smoothing capacitor, a discharge device and a control device, wherein the smoothing capacitor smooths the electrical current, which is used to drive the electric motor. The discharge device is capable of releasing electrical charge, which is stored in the capacitor. The control device is configured such that it receives sensor data, which indicates a state of the motor vehicle, and determines based on the received sensor data if the discharge device is to be activated. Based on the sensor data, it is to be able to be reliably determined if a collision of the motor vehicle has actually occurred. This is to prevent that the discharge device is activated after receiving a collision signal although a collision has not occurred. Therein, examples for the sensor data, which indicates a state of the vehicle, include the vehicle speed, the input voltage of an inverter, the battery voltage, the temperature of a coolant, which cools the inverter or an electric motor, the temperature of a switching element, with which the inverter is equipped, and so on.

Furthermore, DE 10 2017 112 572 A1 describes a direct current intermediate circuit capacitor, which is fast discharged during switching off. An active discharge circuit, which is connected via the intermediate circuit capacitor, has a discharge resistor, which is connected in series with a discharge switch. The discharge switch has a control terminal for selectable switching the discharge switch on and off. A deactivation circuit is coupled to the control terminal and responds to a deactivation command signal to switch the discharge switch off. The deactivation circuit switches the discharge switch on upon stop of the deactivation command signal. A timer circuit, which is supplied with a voltage from the intermediate circuit capacitor, initiates a predetermined time interval upon stop of the deactivation command signal, and continuously switches the discharge switch off after the predetermined time interval, while the voltage from the intermediate circuit capacitor remains above a threshold value. Thereby, the operating time of the active discharge circuit is restricted. This is to allow a simpler configuration of an active discharge resistor, which then does not have to be designed for worst case scenarios, according to which auxiliary contactors for example fail in opening and the battery is still connected to the intermediate circuit capacitor, or the vehicle drives and a counter electromotive force from a rotating motor is coupled to the intermediate circuit capacitor such that, under these circumstances, the discharge resistor does not only discharge the original charge, which is retained in the intermediate circuit capacitor, but also a permanent current, which is supported by the continued supply of voltage. However, the determination of a preset period of time does not allow a particularly good situation adaptation.

Furthermore, DE 10 2017 208 411 A1 describes a method and a control unit for limiting overvoltages due to an electrical load shedding during an operation of a vehicle on-board power supply as a generator, wherein the vehicle on-board power supply comprises at least one battery, an intermediate circuit with an electrical energy storage arranged therein and with an electrical machine operated as a generator connected thereto and a contactor electrically connected between the intermediate circuit and the battery, which has been opened for load shedding. Therein, the intermediate circuit voltage applied to the intermediate circuit is monitored and an active discharge of the energy storage is performed if the intermediate circuit voltage exceeds a voltage threshold. Thereby, an overvoltage on electrical consumers is to be avoided if energy is further fed into the intermediate circuit by the electrical machine, which cannot be absorbed by it anymore due to the disconnection of the battery.

SUMMARY

Example of a method, a control device and a motor vehicle, which allow a situation adaptation as good as possible with respect to the activation of an active discharge circuit is described.

A method, a control device and a motor vehicle with the features may be recited in the respective independent claims. Advantageous configurations of the example may be the subject matter of the dependent claims, of the description as well as of the figures.

In a method according to an example for activating an active discharge circuit for discharging a capacitive energy storage of at least one electrical consumer of an on-board power supply for a motor vehicle by a control device, where an energy source for the on-board power supply can be activated and deactivated, the control device receives a signal for activating the active discharge circuit, examines, after receiving the signal, if the energy source is deactivated according to at least one predetermined first criterion, and activates the discharge circuit only upon satisfaction of a certain condition, which is in that the energy source is deactivated according to the at least one predetermined first criterion.

If the active discharge circuit would be activated if it is assumed that the energy source, e.g. a high-voltage battery, is galvanically disconnected from the on-board power supply, in particular a high-voltage on-board power supply, but this is not the case, for example if the high-voltage supply, that is the high-voltage battery, is disconnected delayed or the switching device, for example a switch-off contactor, has an error during or after a crash, such that the high-voltage system can no longer be switched off, thus, the active discharge would result in a thermal overload and thereby in a faster aging or damage of the active discharge circuit or even in a destruction of the active discharge circuit. In this case, the still stored energy in the intermediate circuit with the capacitive energy storage either could not be discharged anymore. Now, the described example advantageously allows ensuring that the energy source has been properly deactivated before activating the active discharge circuit, thus for example in case of the high-voltage battery as the energy source, has been properly galvanically disconnected from the on-board power supply. If this is not the case, thus, the active discharge circuit is even not activated at all or only activated after proper deactivation, in particular disconnection, if it is effected delayed. Thus, the active discharge circuit is not immediately activated in presence of a corresponding discharge request, but at least delayed, even with proper deactivation or decoupling of the energy source from the on-board power supply, and not at all with not proper deactivation or decoupling of the energy source from the on-board power supply. Thereby, even a temporary short-time activation of the active discharge circuit with still electrically coupled or active energy source can advantageously be avoided, and thereby, it can be advantageously excluded that the active discharge circuit gets damaged or is unnecessarily stressed. Thus, a certain time span, during which the active discharge circuit is activated although the energy source is not properly disconnected from the on-board power supply at all, does not first have to be awaited. In addition, this also allows initiating an early countermeasure, for example transmitting a new switch-off request to a central control unit, to make a new disconnection attempt for disconnecting the energy source from the on-board power supply by means of a switching device or the like. In addition, the examples can also be advantageously used in other areas and not only in the high-voltage range. The electrical consumer, the capacitive energy storage of which is to be discharged as fast as possible, can basically represent any consumer capable of being supplied by an energy source, for example also a consumer of the low-voltage on-board power supply, e.g. of a 12 V on-board power supply. Here too, both a passive discharge and an active discharge circuit can be used for discharge as fast as possible, wherein the active discharge circuit is activated only if the energy source has been decoupled from this low-voltage consumer or has been otherwise switched off such that energy is no longer supplied to the consumer by the energy source. Thereby, the safety in the vehicle can generally also be considerably increased.

Generally, the on-board power supply can be a high-voltage on-board power supply and/or a middle-voltage on-board power supply and/or a low-voltage on-board power supply. The energy source may represent a high-voltage battery, but can also be another energy source, e.g. an energy source for a middle- and/or low-voltage on-board power supply, e.g. a middle-voltage battery, e.g. a 48 V battery, a low-voltage battery, e.g. a 12 V battery, or a converter device, e.g. a DC-DC converter, which supplies the low-voltage on-board power supply from the high-voltage on-board power supply. Correspondingly, the electrical consumer can also represent a high-voltage consumer, middle-voltage consumer, low-voltage consumer or any other consumer. However, an example application may be in the high-voltage range since here especially very great advantages can be achieved by the example caused by the very high voltage level. Although the examples are therefore may be explained below principally with regard to this particular case of application in the high-voltage range, thus, the described developments and examples may analogously also be applicable and transferable to any other case of application.

Thus, the at least one electrical consumer, with which the capacitive energy storage is associated, may present a high-voltage consumer, in particular a pulse inverter. The pulse inverter serves for driving an electrical machine of the motor vehicle. Therein, such inverters typically comprise a relatively large energy storage capacitor. In other words, the capacitive energy storage associated with the pulse inverter of the high-voltage on-board power supply typically has by far the greatest capacitance among all of the capacitive energy storages present in the high-voltage on-board power supply. Nevertheless, the described method can also be applied to other capacitive energy storages of other electrical consumers of the high-voltage on-board power supply or also low-voltage on-board power supply in the same manner. Therein, it can further be provided that a respective high-voltage component, which represents such an electrical consumer, for example has an own active discharge circuit or that a shared active discharge circuit is for example also provided, which is adapted to discharge multiple different capacitive energy storages, which are associated with different electrical high-voltage consumers of the high-voltage on-board power supply.

Furthermore, the active discharge circuit can be configured in principle as known from the prior art such that it is presently not described in detail. In the simplest case, such an active discharge circuit includes a consumer, for example at least one electrical resistor, which is connected in parallel with the capacitive energy storage, which is to be discharged, upon activation of the active discharge circuit. Thereby, the capacitive energy storage discharges via this resistor connected in parallel, at least if energy is not otherwise supplied to the energy storage. Therein, at least one electrical resistor component specifically provided for this purpose can be used as the electrical resistor of the active discharge circuit, or else an electrical consumer, which can also take over other functions for example in the normal operation. In addition, the switching loss of a power transistor can for example also be used for discharge.

If the energy source is in the activated state, thus, it supplies the at least one electrical consumer with energy, and correspondingly not in the deactivated state. The activation and deactivation of the energy source can for example be effected by means of a switching device, e.g. a switch. Therefore, it represents a further advantageous configuration of the examples if the energy source can be coupled to the on-board power supply and be disconnected from the on-board power supply by means of a switching device, and is activated if it is coupled to the on-board power supply by means of the switching device and deactivated if it is disconnected from the on-board power supply by means of the switching device.

Especially, this may be very advantageous if the energy source represents a high-voltage battery, which can then be disconnected from the remaining on-board power supply by contactors. Thus, the switching device can for example be provided in the form of two high-voltage contactors, one for the positive high-voltage potential and one for the negative high-voltage potential, wherein the high-voltage contactors disconnect the high-voltage battery from the high-voltage on-board power supply in the opened state and couple the high-voltage battery to the high-voltage on-board power supply in the closed state. If the high-voltage on-board power supply is in the switched off state, thus, it is to be understood thereby that the high-voltage battery is galvanically disconnected from the high-voltage on-board power supply. For controlling the switching device to couple the high-voltage battery to the on-board power supply or to decouple it, that is electrically disconnect it, therefrom, a further separate control device can be provided, which is referred to as central control unit within the scope of the examples. However, it is basically also conceivable that the control device for activating the active discharge circuit is also formed for controlling the switching device or is at least a part of this central control unit.

Within the scope of the described examples, a circuit is to be understood to be an active discharge circuit, which has to be actively transferred into the activated state, in particular has to be controlled, to activate and/or to deactivate its discharge functionality. Therein, the control may be effected by software of the control device, e.g. a controller. Basically, it is also conceivable that the active discharge is activated independently of software and purely based on hardware, in particular also as a hardware fallback level. For example, this can be used in case of a failure of the control device to still allow discharge as fast as possible. In addition, the term "active charge circuit" is not to imply that it is permanently active. It is to only clarify the difference to a passive discharge circuit, which is typically realized of at least one resistor or consumer or a resistor chain permanently connected in parallel with the capacitive energy storage and therefore does not have to be activated by control. In particular, the passive discharge or passive discharge circuit is a resistor chain, which is either always applied or can be controlled via a self-conducting MOSFET (metal oxide field effect transistor). In some circumstances, thus, a passive discharge circuit can also be capable of being activated by control or be formed variable in its characteristics. In this case, the passive discharge circuit, for example in use of a self-conducting MOSFET, is active in case of a failure of the control, i.e. it discharges the capacitive energy storage and has to be actively controlled for deactivation. This reduces the energy losses in the normal operation. For interim discharge, i.e. before the activation of the active discharge circuit, an alternative circuit or load can basically also be used and connected, e.g. if the passive discharge fails for any reasons. The great difference of an active discharge circuit to a passive discharge circuit is especially in that a considerably faster discharge of the capacitive energy storage can be accomplished by an active discharge circuit than by a passive discharge circuit, at least in case that energy is not supplied to the capacitive energy storage by another energy source, in particular not by the high-voltage battery or the electrical machine, during the discharge. Correspondingly, the discharge resistance used in a passive discharge circuit is considerably greater than the discharge resistance used for the active discharge circuit, independently of the fact if it is provided by an own resistor component, which is specifically provided for this purpose, or by a further electrical consumer or the like. The passive discharge correspondingly requires a discharge time in the range of e.g. minutes, while an active discharge can be executed in the second range, e.g. in the single-digit second range. The high-voltage battery as the energy source is configured such that a battery voltage of at least 60 Volts is provided by it, in particular of above 100 Volts and for example of several 100 Volts, for example 400 Volts or 800 Volts or more.

In an advantageous configuration of the examples, the signal for activating the active discharge circuit is provided depending on a signal for disconnecting the energy source, in particular the high-voltage battery, from the on-board power supply, in particular high-voltage on-board power supply, by means of the switching device. Therein, the signal for activating the active discharge circuit and the signal for disconnecting the high-voltage battery can also be triggered by a common trigger signal, for example a crash signal, which is provided if a crash sensor for example detects a collision, a terminal 15 off signal, which is output upon deactivating the ignition, that is upon opening the terminal 15, or also by signals, which are output in other situations and which trigger a disconnection of the high-voltage battery from the high-voltage on-board power supply. Whenever the high-voltage battery is disconnected from the high-voltage on-board power supply, thus, the capacitive energy storage may also be discharged via the active discharge circuit.

In a further very advantageous configuration of the examples, the predetermined first criterion includes that an on-board power supply voltage in the on-board power supply changes by a presettable first minimum value within a presettable first period of time, in particular that a magnitude of the on-board power supply voltage in the on-board power supply decreases by the first minimum value, which in particular represents a positive value, within the presettable first period of time.

Accordingly, not only a voltage limit value is thus compared to a limit value, to decide whether or not the active discharge circuit is activated, but it can rather be examined based on the first criterion if the on-board power supply voltage, in particular high-voltage on-board power supply voltage, decreases in magnitude with an adequate speed usual in the normal case, which can be specified by the presettable first period of time as well as by the presettable first minimum value in suitable manner. Therein, the presettable first period of time may be in the range of several hundred milliseconds and is in particular less than one second. For example, this presettable first period of time can be 300 milliseconds. The presettable first minimum value or the magnitude thereof can be at least several ten Volts and may be maximally hundred Volts, for example this first minimum value or the magnitude thereof can be in the range of 30 Volts. The high-voltage on-board power supply voltage in the high-voltage on-board power supply can for example be defined as that voltage, which is applied between the connection points of the high-voltage on-board power supply for electrically connecting to the high-voltage battery. If the high-voltage battery is electrically connected to the high-voltage on-board power supply, thus, the battery voltage capable of being tapped between the poles of the high-voltage battery is applied between these connection points as the high-voltage on-board power supply voltage. For ascertaining the high-voltage on-board power supply voltage, it can be measured, for example as the voltage applied between the mentioned connection points. Alternatively, it can also be measured as the input voltage applied to the electrical consumer. It then only minimally differs from the voltage capable of being tapped at the connection points caused by line losses or the like. In addition, the high-voltage on-board power supply voltage can be tapped at any location between a positive and a negative high-voltage line of the high-voltage on-board power supply, which are connected to the respective mentioned connection points for coupling to the high-voltage battery. The high-voltage consumers can also be correspondingly connected to these high-voltage lines in the form of a parallel connection, of which at least one represents the electrical consumer of the high-voltage on-board power supply, the capacitive energy storage of which is to be discharged.

If the high-voltage battery is properly disconnected from the high-voltage on-board power supply, thus, the high-voltage on-board power supply voltage drops to zero or nearly zero after decoupling within a certain time starting from the battery voltage in the still coupled state. Therein, this drop in turn relates to the magnitude of the high-voltage on-board power supply voltage and depending on the fact if the high-voltage on-board power supply voltage is negatively or positively defined. According to the first criterion, it can now be advantageously examined if this drop of the magnitude of the high-voltage on-board power supply voltage occurs as expected. For example, if the high-voltage on-board power supply voltage decreases after decoupling the battery, but unusually slowly, thus, this too is an indication of an error and can be detected by examining for the satisfaction of the first criterion. In this case too, the activation of the active discharge circuit can for example be prevented or at least temporarily suspended until a proper disconnection of the high-voltage battery from the high-voltage on-board power supply can be assumed. Thereby, this first criterion allows a considerably better situation adaptation and offers considerably more safety than previous concepts.

In a further advantageous configuration of the examples, the capacitive energy storage can be discharged via a passive discharge circuit, wherein the capacitive energy storage is at least partially discharged by the passive discharge circuit at least during the presettable period of time, if the energy source, in particular the high-voltage battery, is disconnected from the on-board power supply, in particular the high-voltage on-board power supply. For example, the passive discharge circuit is provided by an electrical consumer, in particular an electrical resistor component, permanently connected in parallel with the capacitive energy storage. By such a passive discharge circuit, thus, electrical energy is normally always converted into heat as long as energy is stored in the capacitive energy storage, at least if the electrical consumer connected in parallel as a part of the passive discharge circuit is configured as an electrical resistor component or comprises a such one, or else into another form of energy different from electrical energy. This results in discharge of the capacitive energy storage only if the capacitive energy storage is not additionally fed from an energy source in the meantime, as it is the case if the high-voltage battery is for example still coupled to the high-voltage on-board power supply. In order to therein keep the energy losses as low as possible in the normal operation, i.e. with activated high-voltage on-board power supply, the electrical consumer of the passive discharge circuit is typically provided with a very high electrical resistance. Correspondingly, a purely passive discharge of the capacitive energy storage normally also takes relatively long. Nevertheless, such a passive discharge circuit, even if the high-voltage battery has been properly disconnected from the high-voltage on-board power supply, results in a gradual discharge of the capacitive energy storage and thereby also contributes to or causes a reduction of the magnitude of the high-voltage on-board power supply voltage in the switched-off high-voltage on-board power supply. Such a passive discharge circuit too can again be specifically provided for the electrical consumer, e.g. the electrical high-voltage component, which includes the capacitive energy storage. In particular, such a passive discharge circuit can again be associated with multiple respective consumers, e.g. high-voltage components of the high-voltage on-board power supply. However, a passive discharge circuit can also again be commonly used by multiple electrical components. Combinations hereof are also conceivable.

In a further advantageous configuration of the examples, if the examination reveals that the energy source has been deactivated according to the at least one predetermined first criterion, in particular the high-voltage battery has been disconnected from the high-voltage on-board power supply according to the at least one predetermined first criterion, the active discharge circuit is activated and it is examined after the activation of the active discharge circuit if the magnitude of the on-board power supply voltage, in particular high-voltage on-board power supply voltage, has reached or falls below a presettable voltage final value, and if so, the active discharge circuit is deactivated. If the first criterion is satisfied, thus, it can be assumed, at least for the moment, that the high-voltage battery has been properly disconnected from the high-voltage on-board power supply, and the active discharge circuit can thus be advantageously activated to discharge the capacitive energy storage. Concomitant therewith, the high-voltage on-board power supply voltage will then normally also further reduce at least in magnitude. If it is small enough or even zero, thus, the active discharge circuit can again be deactivated. Therein, this presettable voltage final value can thus be zero or also be finitely chosen, for example be maximally up to 60 Volts. As initially already mentioned, upon falling below a high-voltage on-board power supply voltage of 60 Volts, a danger by an electrical shock is no longer to be assumed, and the high-voltage on-board power supply is deemed to be transferred into a safe state. The active discharge circuit can also be correspondingly earlier deactivated before the high-voltage on-board power supply voltage has decreased to zero Volts. Then, the remaining discharge can for example be accomplished by the passive discharge circuit.

Therein, it is further very advantageous if also during the activated state of the active discharge circuit, it is at least once again examined if the energy source is still properly deactivated and for example the high-voltage battery as the energy source is still properly disconnected from the high-voltage on-board power supply. Thus, errors in opening or closing the contactors or generally the switching device during the active discharge can advantageously also be excluded and otherwise the active discharge can be discontinued, whereby a damage or impairment of the active discharge circuit can again be advantageously prevented.

Correspondingly, it represents a further very advantageous configuration of the examples that if the examination reveals that the energy source has been disconnected from the on-board power supply according to the at least one predetermined first criterion, the active discharge circuit is activated and after the activation of the active discharge circuit, it is examined if the on-board power supply voltage in the on-board power supply satisfies at least one second criterion, and if the examination reveals that the at least one second criterion is not satisfied, the active discharge circuit is deactivated, in particular without the magnitude of the on-board power supply voltage having reached or fallen below the presettable voltage final value. According to the second criterion, as already mentioned, it can for example again be examined if the energy source, in particular the high-voltage battery, is still properly disconnected from the high-voltage on-board power supply. Thus, if an error occurs only during the active state of the active discharge circuit, thus, the active discharge can advantageously be interrupted in that the active discharge circuit is again deactivated, even if the above described presettable voltage final value has not yet been reached or been undershot by the magnitude of the high-voltage on-board power supply voltage. Hereby, the safety can be further increased and a damage or impairment of the active discharge circuit can be excluded in even more reliable manner.

According to a further, very advantageous configuration of the examples, the second criterion is in that the magnitude of the on-board power supply voltage in the on-board power supply decreases by a presettable second minimum value within a presettable second period of time. According to this second criterion, thus, it can again be advantageously examined if the magnitude of the high-voltage on-board power supply voltage adequately fast decreases also in the further course to assume a further proper disconnection of the high-voltage battery form the high-voltage on-board power supply. Therein, both the second period of time and the second minimum value can be chosen different from the first period of time and the first minimum value, respectively. However, the first and the second period of time can optionally also be identically chosen and/or the first and the second minimum value can be identically chosen. The second period of time may be less than the first period of time and the second minimum value is greater than the first minimum value. For example, the second period of time can be 200 milliseconds and the second minimum value can be 100 V. In order to satisfy the second criterion, a faster decrease in magnitude of the high voltage in the high-voltage on-board power supply is required than for satisfying the first criterion. This is because a considerably faster discharge of the high-voltage on-board power supply and a decline of the magnitude of the high-voltage on-board power supply voltage resulting from it should be able to be realized with activated active discharge circuit than without activation of the active discharge circuit only by the passive discharge circuit. This in turn is caused in that the active discharge circuit is at least temporarily or permanently activated during the second period of time. For example, the second period of time can already begin to run before the activation of the active discharge circuit, for example as soon as the last voltage value of the high-voltage on-board power supply voltage has been captured, to examine the satisfaction of the first criterion, or the second period of time can also begin to run with the beginning of the activation of the active discharge circuit or shortly thereafter. Thus, the active discharge circuit is at least temporarily activated, while the second period of time runs. In normal case, that is without error, the magnitude of the high-voltage on-board power supply voltage will hereby considerably decrease within shortest time. Correspondingly, it can also be correspondingly fast determined by examination for this second criterion if an error is nevertheless present. Accordingly, suitable measures in turn can be extremely fast taken thereby, like the deactivation of the active discharge circuit.

In a further advantageous configuration of the examples, it can also be provided that it is examined if the second criterion is satisfied only if the magnitude of the on-board power supply voltage is greater than a presettable voltage limit value, for example 60 Volts or 30 Volts, and which is greater than the above mentioned voltage final value. Namely, if the on-board power supply voltage, in particular the high-voltage on-board power supply voltage, is already sufficiently small in magnitude and is below this voltage limit value, thus, the active discharge circuit can simply remain activated without examination for the satisfaction of the second criterion until the voltage final value is for example reached, for example zero Volts.

As long as this second voltage limit value is not reached, the method can additionally be continued by new examination for the satisfaction of the second criterion. This means, it can be repeatedly examined if the magnitude of the on-board power supply voltage decreases by a presettable value within a presettable time span. Therein, these presettable time spans and presettable values, respectively, can remain the same in each repetition step and for example be chosen equal to the second period of time and equal to the second minimum value or optionally be differently chosen. Thereby, until an uncritical voltage value of the high-voltage on-board power supply voltage is reached, it can be continuously examined if the high-voltage battery is still properly disconnected from the high-voltage on-board power supply and otherwise another error either does not occur, which is opposed to a proper discharge of the high-voltage on-board power supply. By this repeated examination, it can be ensured that the active discharge circuit does not get damaged or is unnecessarily stressed due to such an error.

In a further advantageous configuration of the examples, if the first criterion is not satisfied, at least one action is initiated by the control device, in particular at least one of the following actions: entering an error into an error memory, examining a communication link to a certain central control unit for controlling the switching device, and transmitting a switch-off request for switching the on-board power supply off to the central control unit. These actions cannot only be executed if the first criterion is not satisfied, but for example additionally also if it is determined that the above described second criterion is not satisfied. Thus, if it is determined that the high-voltage battery seems to be not properly disconnected from the high-voltage on-board power supply, a communication link to the central control unit can for example first be examined, which is responsible for the control of the switching device and thus for the disconnection of the high-voltage battery from the high-voltage on-board power supply in terms of control. For example, if it is therein determined that a communication loss has occurred, new communication attempts can be performed by the control device for communication with the central control unit. If they are unsuccessful, an error entry into an error memory can be effected and the method can begin again. If the communication with the central control unit is intact, thus, a new switch-off request for switching the HV voltage off by disconnecting the high-voltage battery from the high-voltage on-board power supply can be transmitted from the control device to the central control unit.

Even if a communication with the central control unit is no longer possible, thus, a new examination can nevertheless occur if the high-voltage on-board power supply voltage has perhaps now decreased by the certain minimum magnitude within the preset period of time. In other words, the examination for the satisfaction of the first criterion can be continuously performed. This has the advantage that it can for example be a transient error and a successful disconnection of the high-voltage battery from the high-voltage on-board power supply can still be assumed anytime. Then, the active discharge circuit can be activated for achieving a safe state as fast as possible. The above mentioned actions can also be repeatedly performed, in particular the examination of the communication link as well as the transmission of the switch-off request.

Furthermore, the described examples also relate to a control device for a motor vehicle for controlling an activation of an active discharge circuit for discharging a capacitive energy storage of at least one electrical consumer of an on-board power supply of the motor vehicle, wherein an energy source for the high-voltage on-board power supply can be activated and deactivated, for example can be coupled to the high-voltage on-board power supply and can be disconnected from the high-voltage on-board power supply by means of a switching device. Therein, the control device is adapted to receive a signal for activating the active discharge circuit, to examine, after receiving the signal, if the energy source is deactivated according to at least one predetermined first criterion, and wherein the control device is adapted to activate the active discharge circuit only upon satisfaction of a certain condition, which is in that the energy source is deactivated according to the at least one predetermined first criterion.

The advantages mentioned for the method according to the examples and their configurations similarly apply to the control device according to the examples.

The control device can comprise a data processing device or a processor device, which is configured to perform the method according to the examples. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured, upon execution by the processor device, to perform the method according to the examples. The program code can be stored in a data memory of the processor device.

Developments of the control device according to the examples, which comprise features, as they have already been described in context of the developments of the method according to the examples, also belong to the examples. For this reason, the corresponding developments of the control device according to the examples are not again described here.

Furthermore, the examples also related to a motor vehicle with a control device according to the examples or one of its configurations.

The motor vehicle according to the examples may be configured as a car, in particular as a passenger car or truck, or as a passenger bus or motorcycle.

BRIEF DESCRIPTION OF THE DRAWINGS

These and other aspects and advantages will become more apparent and more readily appreciated from the following description of the examples, taken in conjunction with the accompanying drawings of which.

DETAILED DESCRIPTION

The embodiments explained in the following are examples. In the examples, the described components of the examples each represent individual features of the examples to be considered independently of each other, which also each develop the examples independently of each other. Therefore, the disclosure is to include also combinations of the features of the examples different from the illustrated ones. Furthermore, the described examples can also be supplemented by further ones of the already described features of the examples.

In the figures, identical reference characters each denote functionally identical elements.

Figure 1:
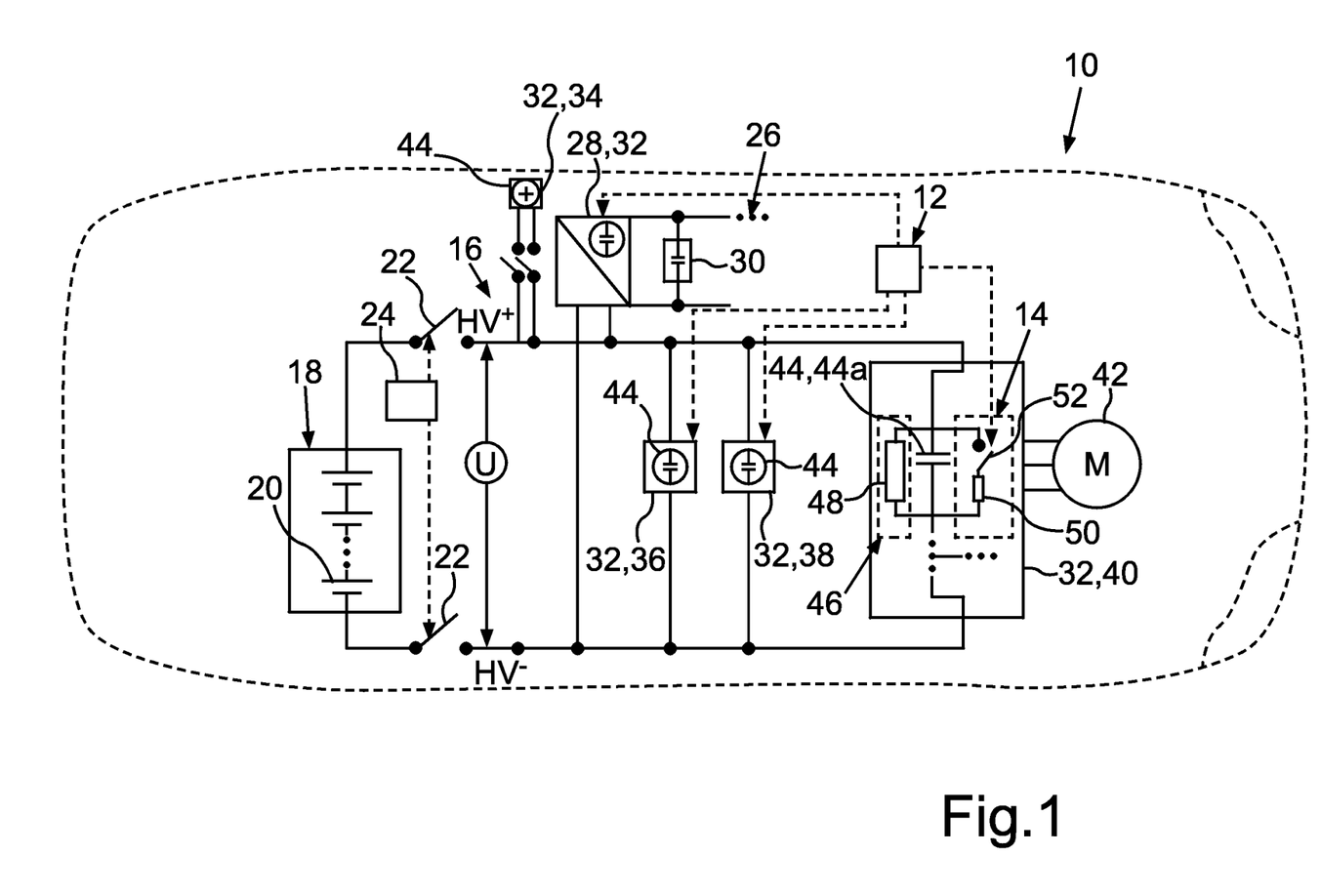
FIG. 1 a schematic representation of a motor vehicle with a control device for controlling the activation of an active discharge circuit according to an example.

FIG. 1 shows a schematic representation of a motor vehicle 10 with a control device 12 for controlling an activation of an active discharge circuit 14 according to an example. Therein, the motor vehicle 10 comprises a high-voltage on-board power supply 16 as well as a high-voltage battery 18 as an energy source for supplying the high-voltage on-board power supply 16. Therein, the high-voltage battery 18 can include numerous individual battery cells 20. They can for example be formed as lithium ion cells. Therein, the high-voltage battery 18 can be coupled to and disconnected from the high-voltage on-board power supply 16 by means of a switching device 22, which is provided in the form of two high-voltage contactors 22 in this example. For controlling the high-voltage contactors 22, the motor vehicle 10 includes a central control unit 24. Besides the high-voltage on-board power supply 16, the motor vehicle 10 also comprises a low-voltage on-board power supply 26. It can also be supplied with energy from the high-voltage on-board power supply 16 via a converting device 28. A low-voltage on-board power supply consumer 30 is exemplarily illustrated, however, the low-voltage on-board power supply 26 can include further such consumers 30.

Now, the high-voltage on-board power supply 16 includes multiple high-voltage components 32, for example a charging device 34 for electrically charging or recharging the high-voltage battery 18, a high-voltage heater 36, an electrical air conditioning compressor 38 and power electronics, in particular a pulse inverter 40 for supplying an electrical machine 42 of the motor vehicle 10. Therein, all of these high-voltage components 32 can comprise more or less large capacitive energy storages 44. Therein, especially the energy storage 44a of the pulse inverter 40 typically has a very large capacitance. In this energy storage 44, even if the high-voltage battery 18 is electrically disconnected from the remaining high-voltage on-board power supply 16, energy can still be stored. Correspondingly, these energy storages 44 have to be discharged after switching the high-voltage on-board power supply 16 off, that is in case that the high-voltage battery 18 is disconnected from the high-voltage on-board power supply 16. For this purpose, discharge circuits are provided. They are basically divided with respect to their type into passive discharge circuits and active discharge circuits. Such discharge circuits are presently illustrated for the pulse inverter 40 in FIG. 1. It includes a passive discharge circuit 46 on the one hand, which is realized by an electrical resistor 48 permanently connected in parallel with the capacitive energy storage 44a in this example. In addition, the pulse inverter 40 includes the active discharge circuit 14 as already mentioned, which in turn includes a discharge resistor 50, which can also be connected in parallel with the capacitive energy storage 44a by controlling via a switching element 52. Further circuit components of the pulse inverter 40 are presently not illustrated for reasons of clarity. In the inactive state of the active discharge circuit 14, the switching element 52 is opened and correspondingly the resistor 50 is not connected in parallel with the energy storage 44a. Therein, the switching element 52 or generally this active discharge circuit 14 is controllable by the control device 12. In the remaining high-voltage components 32 too, such an active and passive discharge circuit can optionally be implemented. Then, at least the respective active discharge circuits can be very analogously controlled by the control device 12, which is to be illustrated by the dashed arrows. In addition, this principle can analogously also be implemented for the low-voltage consumers 30.

In vehicles, such as for example the present motor vehicle 10, with electrical energy storage, for example a high-voltage battery 18, there is basically the requirement to discharge the energy stored in the pulse inverter 40 as fast as possible for safety reasons for example after switching the vehicle 10 off, more precisely after switching the ignition (terminal 15) off, upon a CAN bus timeout or further activation reasons. Thereto, the described passive and active discharge circuits 46, 14 can be used.

Therein, the active discharge is usually activated directly after request, that is after receiving a request signal, without delay. However, the efficiency of the discharge only exists if the high-voltage supply of the pulse inverter 40 has been disconnected from the energy storage, i.e. the high-voltage battery 18. This can be effected by the described contactors 22.

Now, if a disconnection of the high-voltage supply is delayed and the active discharge is already activated, as it is usual in the prior art, this can result in a thermal overload and thereby in faster aging or in damage of the circuit. Furthermore, if the high-voltage system can no longer be switched off during or after a crash by an error in the system, in particular in the switch-off contactor, the active discharge would be activated by the request for example due to the "crash signal" or the signal "terminal 15 off" and could thereby be overloaded or even destructed. Then, the stored energy in the intermediate circuit can no longer be discharged.

Figure 2:
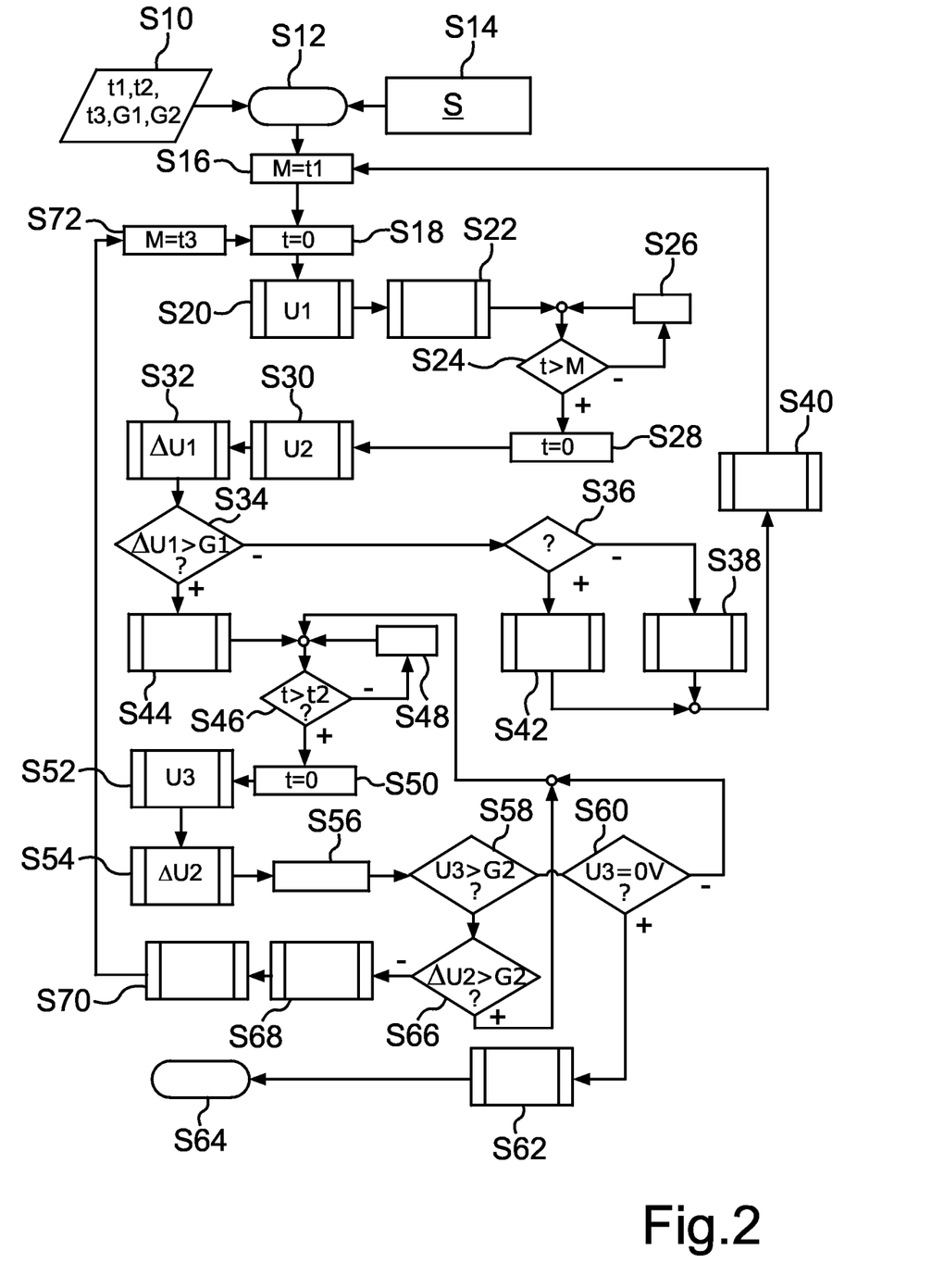
FIG. 2 a schematic representation of a flow diagram for illustrating a method for activating an active discharge circuit according to an example.

Now, this can be advantageously avoided by the described examples, respectively. Thereby, the basic sequence, which will be explained in more detail later in context of FIG. 2, is as follows: First, the high voltage U is measured after a signal for activating the active discharge circuit 14 has been received by the control device 12. Such a signal is issued only if a signal for opening the contactors 22 has also been issued. Therein, a trigger signal can also be issued, for example a crash signal, the above mentioned terminal 15 or the like, which triggers both the signal for opening the contactors 22 and the signal for activating the active discharge circuit 14. Therein, the high voltage, that is the current voltage U of the high-voltage on-board power supply 16, may be measured when the contactors 22 should already be open. Meanwhile, the passive discharge circuit 46 is active. If such a passive discharge circuit 46 operates according to a concept, according to which it is activated, thus, it is also activated especially at this point of time, and if it fails, an alternative circuit or load can be used for passive discharge. The active discharge circuit 14 is not activated at this point of time. First, a certain period of time is awaited, for example 300 milliseconds, and then a new measurement of the high voltage U is performed. Subsequently, the difference to the previously measured high voltages U is evaluated or formed and it is examined if the magnitude thereof is greater than a presettable minimum value, for example 30 Volts. If this is the case, it can be assumed that the high-voltage battery 18 has been properly disconnected from the high-voltage on-board power supply 16, and the active discharge circuit 14 can be activated. Then, a certain period of time, for example 200 milliseconds, can again be awaited and the on-board power supply voltage U can be again measured. Then, the difference to the lastly measured on-board power supply voltage U can be formed and evaluated, and in particular compared to a further minimum threshold value, for example 100 Volts. If this is the case, thus, the activation state of the active discharge circuit remains and the method can thus be continued until the measured high voltage U finally falls below a preset limit value or for example has reached zero Volts. Then, the active discharge is deactivated in that the active discharge circuit 14 is switched off, that is the switching element 52 is opened.

Meanwhile, if the case occurs anytime that the on-board power supply voltage U does not sufficiently drop within the given time intervals, in particular with respect to its magnitude, an error message can be output and further measures can be taken. For example, the error is first recognized by the control device 12, which can be provided by a controller. It can transmit a switch-off request for switching the high voltage U off via a communication interface to the central control unit 24. Communication attempts with the central control unit 24 can also be undertaken, for example to examine, for example in case that the communication has been interrupted. Furthermore, the control device 12, in particular the controller, can set an error and repeat the switch-off of the high-voltage on-board power supply 16 after repeated request via the central control unit 24. This means, the described method then again starts over. Concomitant therewith, the preset periods of time and minimum voltage values can optionally also be adapted. Now, this will be again explained in detail based on FIG. 2.

Therein, FIG. 2 shows a flow diagram for illustrating a method for activating the active discharge circuit 14 according to an example. Therein, step S10 illustrates the transfer of the input parameters to the control device 12. In the present example, they are a first period of time t1, for example 300 milliseconds, a second period of time t2, for example 200 milliseconds, a third period of time t3, for example 150 milliseconds, a first voltage limit value G1, for example 30 Volts, and a second voltage limit value G2, for example 100 Volts. The start S12 of the method is initiated by receiving a signal S in step S14, which represents a request for discharging the capacitive energy storage 44a. Such a discharge request can for example also be initiated by a communication loss. Subsequently, a measurement time variable M is first set equal to the first period of time t1 in step S16. Furthermore, the current measurement time t is set equal to 0 in step S18, and the on-board power supply voltage U is measured as the first voltage measurement value U1 in step S20. Meanwhile, the passive discharge circuit 46 is active. If it should not be permanently active, but have to be activated, it is activated in the optional step S22. Furthermore, it is waited until the first period of time t1 has elapsed, this is effected by repeating the following steps: First, it is examined in step S24 if the current measurement time t is greater than the measurement time variable M. If this is not the case, thus, it is proceeded to step S26 and the current measurement time t is incremented by a time step. In the next time step, it is then again examined in step S24 if the current measurement time S24 is greater than the preset measurement time variable M, which is equal to the preset first period of time t1 in this case. Only if this preset period of time t1 is thus elapsed, it is proceeded to step S28, in which the current measurement time is again set equal to zero, wherein the on-board power supply voltage U of the high-voltage on-board power supply is again measured as the second voltage value U2 at the same time hereto or shortly thereafter in step S30, and the difference to the first voltage value U1 can be ascertained in step S32, which provides a first voltage difference ΔU1. This voltage difference ΔU1 in particular represents the magnitude of the difference of the two voltage values U2 and U1.

Furthermore, it is examined in step S34 if this first voltage difference ΔU1 is greater than the first preset voltage limit value G1. If this is not the case, thus, this is indicative of any type of error. Correspondingly, it can then for example be examined in step S36 if a communication loss is present. If this is not the case, thus, a switch-off request for switching the high voltage off can be transmitted to a central control unit 24 in step S38 and subsequently an error memory entry can be made in step S40. If a communication loss is determined in step S36, thus, further communication attempts with the central control unit 24 can be undertaken in step S42. Then too, a corresponding error memory entry is performed in step S40 and it is again proceeded to step S16. The method correspondingly again starts over. If the error further exists, this approach can be repeated any number of times or be terminated after a preset maximum number of repetitions.

In contrast, if it is determined in step S34 that the first voltage difference ΔU1 is greater than the limit value G1, thus, it is to be inferred that the high-voltage battery 18 has been properly disconnected from the high-voltage on-board power supply 16, and it is proceeded to step S44, in which the active discharge circuit 14 is now activated. Subsequently, the second period of time t2 is awaited. This is again effected in that it is examined in step S46 if the current measurement time is already greater than this second period of time t2. If this is not the case, thus, the current measurement time step is incremented by one in step S48 and it is again examined in the next measurement time step in step S46 if the current measurement time is now greater than the second preset period of time t2. Thus, if the second period of time t2 has finally elapsed, thus, it is proceeded to step S50, in which the current measurement time t is again set equal to zero. Furthermore, the high-voltage on-board power supply voltage is again measured as the third voltage measurement value U3 in step S52. Then, the difference to the previously ascertained voltage measurement value U2 is again formed in step S54 and provided as a second difference value ΔU2. It also again relates to the magnitude of the difference between the voltage measurement values U3 and U2. In step S56, a data transfer for the next iteration is then effected. Therein, the newly ascertained voltage measurement value U3 can for example be set equal to the lastly ascertained voltage measurement value U2. In other words, in an optional next iteration, for a newly measured voltage value, the difference to the third voltage measurement value U3 is then correspondingly formed, and so on. Furthermore, it is examined in step S58 if the lastly ascertained, third voltage measurement value U3 is now greater than the preset second voltage limit value G2. If this is the case, thus, it can be examined in an optional further examination step S60 if the third voltage value U3 is equal to zero Volts. If this is the case, thus, the active discharge circuit 14 is again deactivated in step S62 and the method is terminated in step S64. However, if the third voltage value U3 is not equal to zero Volts, thus, the second period of time t2 can again be awaited in step S46 and the described steps can be again passed through. However, a switch-off in step S62 can also be already effected if the third voltage measurement value U3 is already less than the second voltage limit value G2 or is equal to it. For example, it can be selected very low, for example 30 Volts. With such a low voltage value, the high-voltage on-board power supply 16 can then be regarded as transferred into a safe state. However, if this second voltage limit value G2 is not yet reached in step S58, thus, it is additionally examined in step S66 if the second voltage difference U2, which has been communicated as previously described, is also greater than this voltage limit value G2. Herein, a voltage limit value other than in step S58 could alternatively also be used. Based on this examination step S66, it can in turn be determined if the high-voltage battery 18 is further properly disconnected from the high-voltage on-board power supply 16. Thus, if the voltage difference ΔU2 is also sufficiently great, that is greater than this second limit value G2, thus, it is again proceeded to step S46 here too, the second period of time t2 is again awaited and the described method steps are again performed, which will finally result in the fact that the on-board power supply voltage U will fall below the second limit value G2 in step S58 anytime, such that the method can be terminated by executing the already described steps. However, if it is determined in step S66 that the second voltage difference ΔU2 is not sufficiently small, thus, it is proceeded to step S68, in which the active discharge circuit 14 is again deactivated. Furthermore, an error is again output in step S70 and an error memory entry is performed and it is proceeded to step S72, in which the measurement time variable M is now set equal to the third period of time t3. Then, the method starts over, where now the first period of time t1 is not awaited anymore from step S24, but instead a shorter third period of time t3, which is for example only 150 milliseconds. If an error should further exist or this approach should not result in the end in step S64 anytime, thus, the method can be terminated after a presettable number of repetitions. If an error does not occur, thus, the voltage curves and activation state curves, respectively, as they are illustrated in FIG. 3 and FIG. 4, result.

Figure 3:
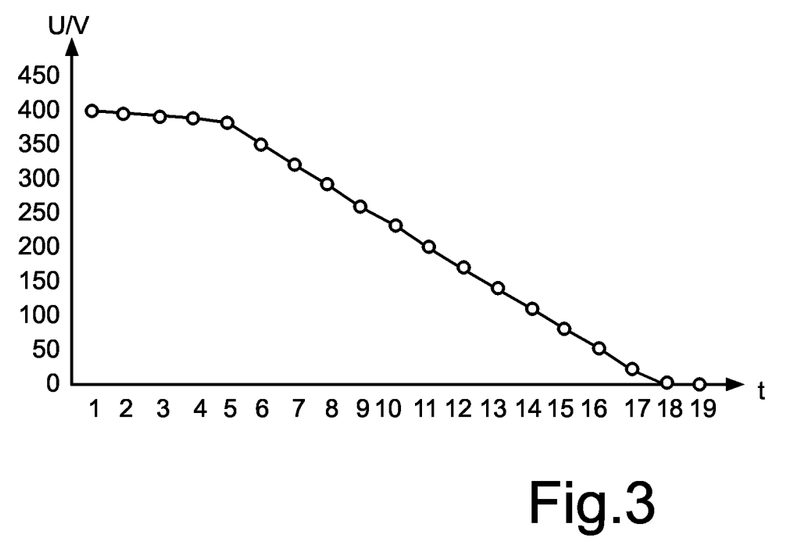
FIG. 3 a graphical illustration of the temporal voltage curve of the on-board power supply voltage after deactivation of the high-voltage on-board power supply according to an example.
Figure 4:
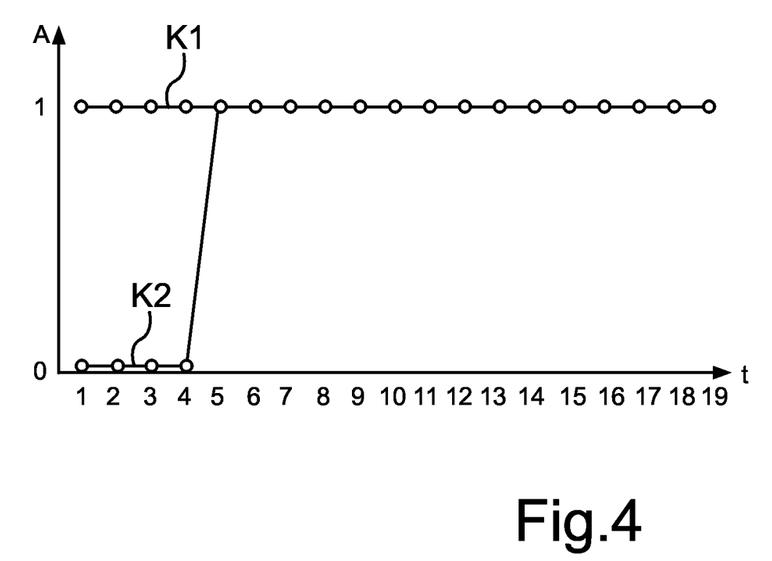
FIG. 4 a schematic representation of the activation states of an active and a passive discharge circuit after disconnection of a high-voltage battery from the high-voltage on-board power supply according to a further example.

Therein, FIG. 3 shows the curve of the voltage U in Volts of the high-voltage on-board power supply depending on the time t, in particular depending on the measurement time steps t. Therein, the time curve begins with opening the high-voltage contactors 22 in the first measurement time step t=1, which properly open in this example and thus properly disconnect the high-voltage battery 18 from the high-voltage on-board power supply 16. Therein, FIG. 4 shows the activation state A of the passive discharge circuit 46 according to a first curve K1, which is thus active during the entire measurement time steps t, which corresponds to the activation state "1", as well as a second curve K2, which illustrates the activation state A of the active discharge circuit 14. It is first deactivated in the first measurement time steps, which corresponds to the activation state "0". As is apparent in FIG. 3, the on-board power supply voltage U therefore also first slowly decreases. However, the decrease is effected within the scope of the preset decrease speed minimum limit such that the active discharge can be activated, as it is the case in FIG. 4 in the transition of the fourth measurement time step to the fifth measurement time step. Correspondingly, the on-board power supply voltage U considerably faster decreases from the fifth measurement time step as is apparent in FIG. 3, until it finally reaches zero Volts. Therein, the active discharge 14 meanwhile remains active all the time as illustrated in FIG. 4 since an error does not occur and the high-voltage battery 18 is also further regarded as properly disconnected from the high-voltage on-board power supply 16, respectively, and a communication loss or the like either does not occur. Subsequently, but not illustrated, the active discharge circuit 14 is then again deactivated.

In summary, it should be noted that according to an example, the voltage is thus measured directly after the discharge request, the passive discharge is used for slow discharge immediately after the discharge request and optionally an alternative load or another circuit part for discharge, then a second measurement of the voltage is performed after for example 300 milliseconds and the difference of the two measured voltages is formed. It must have reached a minimum value, otherwise, the high voltage is not deactivated and error messages are stored. Furthermore, the active discharge is activated if the minimum value has been reached. Thus, in contrast to the previous approach, the activation of the active discharge is delayed, that is not immediately after receiving the discharge request. Optionally, the active discharge time can be shortened by corresponding design of the circuit, in particular of the discharge power thereof. Thereby, the time for the detection of the voltage drop before the activation of the active discharge is increased. In other words, one then has more time to examine if the high-voltage battery has been properly disconnected from the high-voltage on-board power supply without the overall discharge time hereby extending. Furthermore, a cyclical examination of the voltage is effected. In addition, a deactivation of the active discharge is effected during the discharge procedure if the ΔU/Δt to be at least reached, i.e. the temporal voltage change at least to be reached, is not reached. Furthermore, the measurement time for examining the high voltage is adapted. Upon loss of the communication, error messages are stored. Overall, the examples show how systematics for connecting the active discharge can be provided, which allows by the described features to provide a protection of the circuit for active discharge, to examine the high-voltage supply after discharge request, to recognize an error with delayed high voltage switch-off, to set corresponding error messages, to initiate a correct response in case of communication loss, to perform a temporally delayed activation of the active discharge circuit for identification and to provide a cyclical monitoring of the discharge for efficiency.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide v. DIRECTV*, 358 F3d 870, 69 USPQ2d 1865 (Fed. Cir. 2004).

LIST OF REFERENCE CHARACTERS

10 Motor vehicle
12 control device
14 active discharge circuit
16 high-voltage on-board power supply
18 high-voltage battery
20 battery cells
22 high-voltage contactors
24 central control unit
26 low-voltage on-board power supply
28 converting device
30 low-voltage on-board power supply consumer
32 high-voltage components
34 charging device
36 high-voltage heater
38 air conditioning compressor
40 pulse inverter
42 electrical machine
44 capacitive energy storage
44a capacitive energy storage
46 passive discharge circuit
48 resistor
50 discharge resistor
52 switching element
G1 first voltage limit value
G2 second voltage limit value
M measurement time variable
S signal
t measurement time
t1 first period of time
t2 second period of time
t3 third period of time
U high-voltage on-board power supply voltage
U1 first voltage measurement value
U2 second voltage measurement value
U3 third voltage measurement value
ΔU1 first voltage difference
ΔU2 second voltage difference
S10-S64 step

The invention claimed is:

1. A method of activating an active discharge circuit to discharge a capacitive energy storage of at least one electrical consumer of an on-board power supply for a motor vehicle, an energy source for the on-board power supply is to be activated or deactivated, the method comprising:
   by a control device execute a process to,
      receive a signal to activate the active discharge circuit, before an activation of the active discharge circuit after receiving the signal, perform an examination if the energy source is deactivated according to at least one first criterion, and activate the active discharge circuit only upon satisfaction of a condition that the energy source is deactivated according to the at least one first criterion.

2. The method according to claim 1, wherein, the energy source is to be coupled to the on-board power supply and to be disconnected from the on-board power supply by a switching device, and the energy source is to be activated if the energy source is coupled to the on-board power supply by the switching device and is deactivated if the energy source is disconnected from the on-board power supply by the switching device.

3. The method according to claim 2, wherein, if the at least one first criterion is not satisfied, at least one action among following actions is initiated by the control device:

entering an error into an error memory;

examining a communication link to a central control unit to control the switching device; or transmitting a switch-off request for switching the on-board power supply off to the central control unit.

4. The method according to claim 1, wherein, the at least one first criterion includes that an on-board power supply voltage (U) in a on-board power supply changes by a settable first minimum value (G1) within a settable first period of time (t1), wherein a magnitude of the on-board power supply voltage (U) in the on-board power supply decreases by the settable first minimum value (G1) within the settable first period of time (t1).

5. The method according to claim 4, wherein, the capacitive energy storage is to be discharged through a passive discharge circuit, and the capacitive energy storage is at least partially discharged by the passive discharge circuit at least during the settable first period of time (t1) if the energy source is deactivated, wherein the passive discharge circuit is provided by an electrical consumer, and at least one electrical resistor component is permanently connected in parallel with the capacitive energy storage.

6. The method according to claim 4, wherein, if the examination indicates that the energy source is deactivated according to the at least one first criterion, the active discharge circuit is activated and after the active discharge circuit is activated, examining if the magnitude of the on-board power supply voltage (U) has reached or falls below a settable voltage final value, and if so, the active discharge circuit is deactivated.

7. The method according to claim 4, wherein, if the examination indicates that the energy source is deactivated according to the at least one first criterion, the active discharge circuit is activated and after the active discharge circuit is activated, examining if the on-board power supply voltage (U) in the on-board power supply satisfies at least one second criterion, and if the examining indicates that the at least one second criterion is not satisfied, the active discharge circuit is deactivated, without the magnitude of the on-board power supply voltage (U) having reached or undershot a settable voltage final value.

8. The method according to claim 7, wherein, the at least one second criterion is in that the magnitude of the on-board power supply voltage (U) in the on-board power supply decreases by a settable second minimum value (G2) within a settable second period of time (t2).

9. A control device for a motor vehicle to control an activation of an active discharge circuit to discharge a capacitive energy storage of at least one electrical consumer of an on-board power supply of the motor vehicle, an energy source for the on-board power supply to be activated or deactivated, the control device comprising:

a processor device to, receive a signal (S) to activate the active discharge circuit, before an activation of the active discharge circuit after receiving the signal (S), perform an examination if the energy source is deactivated according to at least one first criterion, and activate the active discharge circuit only upon satisfaction of a condition that the energy source is deactivated according to the at least one first criterion.

10. The control device according to claim 9, wherein, the at least one first criterion includes that an on-board power supply voltage (U) in a on-board power supply changes by a settable first minimum value (G1) within a settable first period of time (t1), wherein a magnitude of the on-board power supply voltage (U) in the on-board power supply decreases by the settable first minimum value (G1) within the settable first period of time (t1).

11. The control device according to claim 10, wherein, if the examination indicates that the energy source is deactivated according to the at least one first criterion, the active discharge circuit is activated and after the activation of the active discharge circuit, examining if the on-board power supply voltage (U) in the on-board power supply satisfies at least one second criterion, and if the examining indicates that the at least one second criterion is not satisfied, the active discharge circuit is deactivated, without the magnitude of the on-board power supply voltage (U) having reached or undershot a settable voltage final value.

12. A motor vehicle with a control device according to claim 9.

* * * * *